United States Patent [19]

Bauer

[11] 4,224,835
[45] Sep. 30, 1980

[54] SELF-COOLING RESONANCE TORSIONAL VIBRATION DAMPER

[75] Inventor: Friedrich Bauer, Mittelhembach, Fed. Rep. of Germany

[73] Assignee: Maschinenfabrik Augsburg-Nürnberg Aktiengesellschaft, Nünberg, Fed. Rep. of Germany

[21] Appl. No.: 929,270

[22] Filed: Jul. 31, 1978

[51] Int. Cl.² .................................. F16F 15/10
[52] U.S. Cl. ........................................... 74/574
[58] Field of Search .............. 74/574, 594.5, 604; 188/1 B

[56] References Cited

U.S. PATENT DOCUMENTS

| 2,477,081 | 7/1949 | Peirce | 74/574 |
| 2,585,382 | 2/1952 | Guernsey | 74/574 |
| 3,443,454 | 5/1969 | Hall | 74/574 |

Primary Examiner—Wayne L. Shedd
Attorney, Agent, or Firm—Becker & Becker, Inc.

[57] ABSTRACT

A resonance torsional vibration damper, especially a multi-member vibration damper which includes a primary member including one, preferably a plurality of, fixedly interconnected parts and arranged on a shaft or crankshaft. The damper furthermore includes one or more secondary members arranged adjacent to each other in axial direction but spaced from each other and by means of elastic members connected to the primary member. In the primary part there are provided cooling air openings which lead outwardly and into the region of the secondary members. At the free end face or end faces of one or more secondary members there are provided preferably radially outwardly leading cooling fins.

11 Claims, 7 Drawing Figures

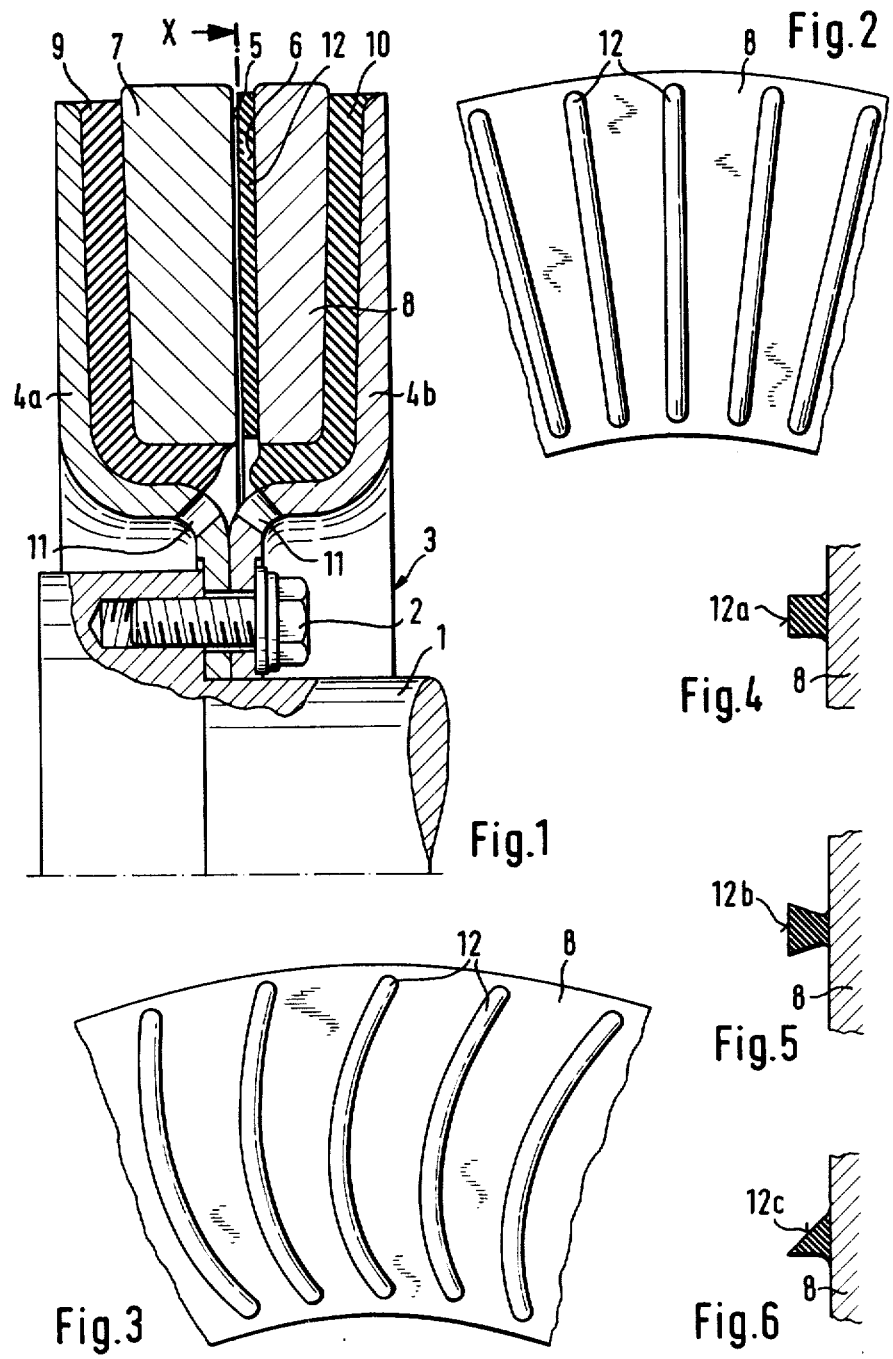

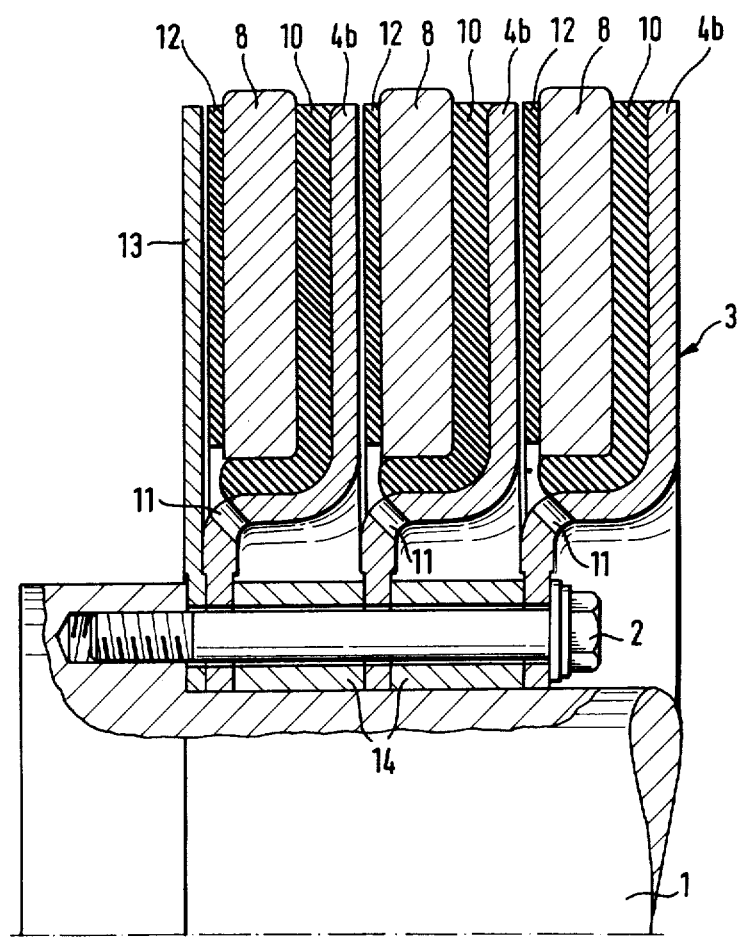

SELF-COOLING RESONANCE TORSIONAL VIBRATION DAMPER

The present invention relates to a resonance torsional vibration damper, especially to a multiple member vibration damper comprising a primary member preferably including a plurality of permanently interconnected parts adapted to be mounted on a shaft or crankshaft and also including one or a plurality of secondary members arranged side by side, but separate from each other, in an axial direction and connected by flexible means to the primary member.

Such torsional vibration dampers are generally known in the art. They are used, for instance, in reciprocating piston internal combustion engines where they are preferably attached to the front end of the crankshaft and serve to detune natural frequencies and to dampen occurring torsional vibrations. As a rule, only simple vibration dampers are used consisting of one primary member and one secondary member. Where in certain cases the torsional vibration problem cannot be overcome or mastered in this way, a multiple damper (including at least two secondary members) is employed because it permits a more effective detuning.

As flexible damping medium used between the primary members and the secondary members mainly rubber is employed which is vulcanized to both members or simply compressed between two concentric rings. As a result of the energy expended in deflecting the rubber and partly also due to heat dissipation from the hot crankshaft, very high damping temperatures are frequently caused in the dampers, especially in multiple member vibration dampers. These temperatures are liable to exceed the permissible temperature limit of about 100° C. so that the type of rubber compositions used at present cause the rubber layers to harden prematurely with the result that cracks develop and the damper eventually loses its effectiveness. Thus the service life of the dampers is substantially reduced.

This is the starting point of the present invention which has for its object to provide adequate cooling for a resonance torsional vibration damper of the type initially described so that the elastic medium, especially the rubber, keeps its properties and the service life of the vibration damper is substantially increased.

These and other objects and advantages of the invention will appear more clearly from the following specification in connection with the accompanying drawings in which:

FIG. 1 is a longitudinal section through one half of a double torsional vibration damper according to the invention;

FIGS. 2 and 3 each show part of a secondary member with different configurations of the cooling fin viewed in the direction of the shaft axis, i.e. in the direction of the arrow "x".

FIGS. 4 to 6 respectively show various cross-sectional shapes of the cooling fins on an enlarged scale; and FIG. 7 is a longitudinal section through one half of a triple member torsional vibration damper according to the invention.

The damper according to the invention is characterized primarily in that the primary member is provided with cooling air passages extending substantially radially outwardly and terminating in the region of the secondary members whereas cooling fins extending preferably radially outwardly are provided on the free end face or end faces of one or several secondary members.

Through the cooling air passages, fresh air enters between the end faces of, e.g., two adjacent secondary members. The cooling fins acting in the fashion of the blading in a radial fan or compressor permit an appropriate delivery head to be obtained, in other words, the air entering through the cooling air passages is accelerated and delivered in a radial direction outwardly so that intensive ventilation and thereby cooling is produced.

The objective of the invention as set forth above is thus fully achieved.

As a further refinement of the invention, it is proposed that the cooling air passages be arranged on the entire circumference of the primary member and formed as drilled ducts or oblong ports. It is further proposed that the cooling fins be spaced uniformly around the entire circumference of the secondary member or members. They may be formed to extend radially outwardly on straight lines or be forward curved or backward curved relative to the direction or rotation in accordance with established rules of fan and compressor design. The cross section of the cooling fins may be of any desired shape, but a rectangular, trapezoidal, or triangular section would be preferred.

Finally, the invention proposes the use of cooling fins made of elastic material, preferably rubber bonded to the secondary member or members.

If only one secondary member is provided or if a plurality of secondary members is used with the cooling fins directed in an axial direction, it appears desirable to provide a guide plate ahead of the cooling fins of the first secondary member in order to create an intensive air flow at that point.

Referring to FIG. 1, a double member torsional vibration damper 3 is mounted on a shaft 1 by means of screws 2. The torsional vibration damper 3 includes a primary member comprising two parts 4a and 4b securely connected with each other by the screws 2 (one only being shown) and two secondary members 7, 8 arranged with their end faces 5, 6 facing, but not contacting, each other in an axial direction. The parts 4a, 4b, 7, 8 of the primary and secondary members are preferably made of steel; the latter may alternatively be made of cast iron. Each secondary member 7, 8 is connected by bonding a rubber layer 9, 10 serving as a damping agent to the primary member 4a, 4b in a manner making them inseparable but permitting relative motions.

The primary member 4a, 4b is formed with cooling air ducts 11 spaced from each other and distributed over its circumference and extending at an angle radially outwardly to communicate finally with the gap between the end faces 5, 6 of the two secondary members 7, 8. In addition thereto, there are radially disposed cooling fins 12 which are made of rubber and bonded to the secondary member 8 and are also uniformly distributed over its circumference.

The cooling air ducts 11 admit additional air to the space between the end faces 5, 6 of the secondary members 7, 8 which eventually is delivered in an outward direction by the cooling fins 12 as the vibration damper 3 rotates in the fashion of a radial fan or compressor whereby intensive cooling is produced.

FIG. 2 shows that the equally spaced straight cooling fins 12 extend radially to the outer perimeter whereas in FIG. 3 they are curved similar to the blades of a fan or compressor.

As can be seen from FIGS. 4 to 6, the cross-section of the cooling fins 12 is preferably rectangular (12a), trapezoidal (12b) or triangular (12c).

Referring to FIG. 7, the identical parts are identified with the same numerals as in FIG. 1. In the triple-member vibration damper 3, the primary member consists of three identical parts 4b which, with spacers 14 interposed, are slipped onto the shaft 1 and firmly secured to each other by screws 2. With a view to obtaining the same cooling effect on the front secondary member 8 shown at the left in the figure or, respectively, by its cooling fins 12, a guide plate 13 is provided in front of said member.

It is, of course, to be understood that the present invention is in no way limited to the specific showing in the drawings but also encompasses any modifications within the scope of the appended claims.

What is claimed is:

1. A resonance torsional vibration damper, especially a multi-vibration damper, which includes in combination shaft means, a primary member mounted on said shaft means, at least one secondary member connected via elastic means to said primary member, said primary member being provided with cooling air passages leading approximately radially outwardly into the region of said at least one secondary member, and cooling fins provided on the free end face of said at least one secondary member and leading radially outwardly.

2. A resonance torsional vibration damper, especially a multi-vibration damper, which includes in combination: shaft means, a plurality of primary members mounted on and connected to said shaft means, a plurality of secondary members arranged in spaced relationship and adjacent to each other in axial direction of said shaft means, elastic means interposed between said secondary members and said primary members, said secondary members being connected to said primary members through the intervention of said elastic means, said primary members being provided with nearly radially extending cooling passages connected to the outside and leading into the region of said secondary members and elastic means, and cooling fins provided at the end face of at least one of said secondary members.

3. A resonance torsional vibration damper in combination according to claim 2, in which said cooling fins lead radially outwardly.

4. A resonance torsional vibration damper in combination according to claim 2, in which said air cooled passages are arranged on the entire circumference of said primary members and are in the form of bores.

5. A resonance torsional vibration damper in combination according to claim 2, in which said air cooled passages are arranged on the entire circumference of said primary members and are in the form of slots.

6. A resonance torsional vibration damper in combination according to claim 2, in which said cooling fins are of elastomeric material and are vulcanized to said secondary members.

7. A resonance torsional vibration damper in combination according to claim 2, in which said cooling fins are uniformly arranged over the entire circumference of said secondary members and extend rectilinearly radially outwardly.

8. A resonance torsional vibration damper in combination according to claim 2, in which said cooling fins are uniformly arranged over the entire circumference of said secondary members and extend in the direction of rotation of said shaft means in a streamlined manner while extending radially outwardly.

9. A resonance torsional vibration damper in combination according to claim 1, in which the cooling fins have any suitable cross section.

10. A resonance torsional vibration damper in combination according to claim 1, in which said cooling fins have a cross section selected from rectangular, trapezoidal and triangular cross sections.

11. A resonance torsional vibration damper in combination according to claim 2, in which the cooling fins point in axial direction, and in which a guiding plate is provided ahead of the cooling fins associated with the serially fixed secondary member.

* * * * *